United States Patent
Cho et al.

(10) Patent No.: US 7,295,943 B2
(45) Date of Patent: Nov. 13, 2007

(54) GEOMAGNETIC SENSOR FOR CALIBRATING AZIMUTH BY COMPENSATING FOR AN EFFECT OF TILTING AND METHOD THEREOF

(75) Inventors: Woo-jong Cho, Suwon-si (KR); Sang-on Choi, Suwon-si (KR); Sung-mun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 53 days.

(21) Appl. No.: 11/003,320

(22) Filed: Dec. 6, 2004

(65) Prior Publication Data

US 2007/0239401 A1    Oct. 11, 2007

(30) Foreign Application Priority Data

Dec. 30, 2003    (KR)    ............... 10-2003-0099709

(51) Int. Cl.
*G01C 17/38*    (2006.01)
(52) U.S. Cl. .................. 702/95; 702/92; 702/150; 702/153
(58) Field of Classification Search .............. 702/92, 702/95, 150, 153
See application file for complete search history.

(56) References Cited

U.S. PATENT DOCUMENTS

| | | |
|---|---|---|
| 4,611,293 A | 9/1986 | Hatch et al. |
| 4,668,100 A | 5/1987 | Murakami et al. |
| 4,672,565 A | 6/1987 | Kuno et al. |
| 4,698,912 A | 10/1987 | Fowler et al. |
| 4,797,841 A | 1/1989 | Hatch |
| 5,440,303 A | 8/1995 | Kinoshita |
| 6,130,534 A | 10/2000 | Huang et al. |
| 6,282,803 B1 * | 9/2001 | Dunne .................. 33/361 |
| 6,539,639 B2 | 4/2003 | Smith |
| 6,543,146 B2 * | 4/2003 | Smith et al. .............. 33/356 |
| 6,964,107 B1 | 11/2005 | Ahola |

FOREIGN PATENT DOCUMENTS

EP    1 510 781 A1    3/2005

(Continued)

OTHER PUBLICATIONS

Japanese Abstract No. 2000009468.

*Primary Examiner*—John Barlow
*Assistant Examiner*—Stephen J Cherry
(74) *Attorney, Agent, or Firm*—Sughrue Mion Pllc.

(57) ABSTRACT

A geomagnetic sensor capable of calibrating an accurate azimuth even if the geomagnetic sensor is in a tilting state. The geomagnetic sensor includes a geomagnetism measuring unit, having a drive pulse generating unit for generating a pulse signal and two-axis flux gates provided in X-axis and Y-axis directions which are orthogonal to each other, for outputting voltage values of the two-axis flux gates corresponding to geomagnetism produced by the drive signal, an acceleration sensor for measuring a pitch angle and a roll angle which indicate a tilting degree of the geomagnetic sensor based on X axis and Y axis, and a control unit for calibrating the azimuth by extracting normalization factors by compensating the voltage values outputted from the geomagnetism measuring unit using the pitch angle and the roll angle measured by the acceleration sensor and normalizing the compensated voltage values using the normalization factors.

6 Claims, 4 Drawing Sheets

FOREIGN PATENT DOCUMENTS

| | | |
|---|---|---|
| JP | 61-193016 A | 8/1986 |
| JP | 5-071713 U | 9/1993 |
| JP | 9-325029 A | 12/1997 |
| JP | 2000-009468 A | 1/2000 |
| JP | 2002-196055 A | 7/2002 |
| KR | 2002-0030244 A | 4/2002 |
| WO | WO 02/46693 A2 | 6/2002 |

* cited by examiner

GEOMAGNETIC SENSOR FOR CALIBRATING AZIMUTH BY COMPENSATING FOR AN EFFECT OF TILTING AND METHOD THEREOF

CROSS-REFERENCE TO RELATED APPLICATIONS

This application claims priority under 35 U.S.C. § 119 from Korean Patent Application No. 10-2003-0099709, filed on Dec. 30, 2003, the entire content of which is incorporated herein by reference.

BACKGROUND OF THE INVENTION

1. Field of the Invention

The present invention relates to a geomagnetic sensor, and more particularly, to a geomagnetic sensor which can calibrate an accurate azimuth by measuring the present degree of tilting using an acceleration sensor and then reflecting the degree of tilting in measurement of the azimuth.

2. Description of the Related Art

A geomagnetic sensor is a device for measuring the intensity and direction of geomagnetism that humans cannot sense. Specially, a geomagnetic sensor using a flux gate is called a flux-gate type geomagnetic sensor.

The flux-gate type geomagnetic sensor has a magnetic core made of high-permeability material such as permalloy, and senses the strength and direction of an external magnetic field by applying an excited magnetic field through a drive coil and measuring secondary harmonic components, which is in proportion to the external magnetic field, using the magnetic saturation and non-linear magnetic characteristics of the magnetic core.

This flux-gate type magnetic sensor, which was developed about the end of the 1930's, has a good sensitivity, is economical and small-sized in comparison to other types of geomagnetic sensors. Also, since the flux-gate type magnetic sensor has a low power consumption and a superior long-term stability, it has been widely used for non-military and military purposes such as mineral vein probes, target detection, control of physical attitudes of an artificial satellite, space exploration, etc., together with detection of weak magnetic fields and measurement of absolute directions of the earth. Also, researches for the performance improvement of the flux-gate type magnetic sensor have been continuously propelled.

Specially, with the gradual development of MEMS (Micro Electro Mechanical System) technology, there have been attempts to develop a low power consumption type subminiature flux-gate sensor using the MEMS technology.

FIG. 1 is a block diagram illustrating the construction of a conventional flux-gate type geomagnetic sensor 10. Referring to FIG. 1, the conventional geomagnetic sensor includes a drive signal generating unit 11, a geomagnetism measuring unit 12, a signal processing unit 13 and a controller 14.

The drive signal generating unit 11 serves to generate an electric signal that can drive the geomagnetism measuring unit 12. Generally, such an electric signal may be a pulse wave or an inverted pulse wave.

The geomagnetism measuring unit 12 may be a three-axis flux gate, but it is preferable to use a two-axis flux gate as the geomagnetism measuring unit 12 since the size of the geomagnetic sensor 10 itself should be small enough to be mounted in a small-sized device such as a portable phone. In the case of using the two-axis flux gate, the geomagnetism measuring unit 12 includes two orthogonal flux gates. Also, the respective flux gate includes a square ring type magnetic core, a drive coil and a detection coil wound on the magnetic core. The drive coil serves to receive the electric signal outputted from the drive signal generating unit 11 and excite the magnetic core, and the detection coil serves to detect an electromotive force induced by the magnetism produced through the driving of the drive coil.

The signal processing unit 13 serves to perform a series of processes such as amplification, chopping, etc., of a voltage component, which is induced from the detection coil in proportion to the intensity of an external magnetic field, and then output voltage values through the X-axis and Y-axis flux gates.

An acceleration sensor 15 is implemented by two orthogonal X-axis (i.e., roll axis) and Y-axis (i.e., pitch axis) flux gates such as the geomagnetism measuring unit 12, and serves to calculate a pitch angle and a roll angle. The pitch angle means an angle measured between the geomagnetic sensor 10 and an X-Y plane on which the geomagnetic sensor 10 is placed in the case of rotating the geomagnetic sensor around the Y-axis. The roll angle means an angle measured between the geomagnetic sensor 10 and the X-Y plane in the case of rotating the geomagnetic sensor around the X axis.

The control unit 14 calibrates the azimuth by normalizing the X-axis and Y-axis flux-gate voltage values to values within a predetermined range using predetermined normalization factors and then substituting the normalized values stored in memory 16 in a specified equation. The normalization factors are required in a normalization process for mapping output values of the sensor onto values in the range of +1 to −1, and include a bias (i.e., offset) factor, a scale factor, etc.

The normalization factor can be calculated by recording geomagnetic sensor values measured whenever the geomagnetic sensor takes one revolution, determining the maximum and minimum values, and then substituting the maximum and minimum values in the specified equation. This process of determining the normalization factor by obtaining the maximum and minimum values as rotating the geomagnetic sensor is called a compensation process.

If the geomagnetic sensor tilts during the compensation process as above, however, the output values of the geomagnetic sensor are changed according to the tilting degree of the geomagnetic sensor, and this may cause an erroneous measurement of the maximum and minimum values. In other words, the normalization factors required for the azimuth calibration may also be affected by the tilting of the geomagnetic sensor occurring during the compensation process.

Accordingly, although the maximum, minimum and average values should be measured as the geomagnetic sensor is rotated in a horizontal state in order to properly calibrate the azimuth by calculating the normalization factors, the geomagnetic sensor may be shaken during its rotation. Also, in the case that the geomagnetic sensor is unavoidably installed in a tilting state in a portable phone, it is difficult to keep the geomagnetic sensor in the horizontal state. Accordingly, the maximum and minimum values may be erroneously measured due to the tilting of the geomagnetic sensor, and this may cause an erroneous calculation of the normalization factors and thus cause an error to occur in the finally obtained azimuth.

The measurement error of the azimuth that occurs after the compensation due to the tilting angle is shown in Table 1 below.

TABLE 1

| Angle tilting during compensation | Measurement error occurring after compensation |
|---|---|
| 0° | ≦3° |
| 3° | ≦6° |
| 5° | ≦8° |
| 10° | ≦12° |
| 20° | ≦20° |
| 30° | ≦30° |

As shown in Table 1, as the angle tilting during the compensation becomes wider, the measurement error occurring after the compensation also becomes greater. Accordingly, if the geomagnetic sensor tilts over a predetermined angle, it cannot properly calibrate the azimuth.

SUMMARY OF THE INVENTION

The present invention has been developed in order to solve the above drawbacks and other problems associated with the conventional arrangement. An aspect of the present invention is to provide a geomagnetic sensor, a method of normalizing the geomagnetic sensor, and a method of calibrating azimuth of the geomagnetic sensor, which can calibrate an accurate azimuth through normalization in consideration of the tilting of the geomagnetic sensor by measuring the present degree of tilting and then compensating for normalization factors through reflecting the degree of tilting in measurement of the azimuth.

The foregoing and other objects and advantages are substantially realized by providing a geomagnetic sensor, according to an exemplary embodiment of the present invention, which includes a geomagnetism measuring unit for outputting voltage values corresponding to measured geomagnetism; an acceleration sensor for measuring a pitch angle and a roll angle which indicate a tilting degree of the geomagnetic sensor based on a horizontal state of the geomagnetic sensor; and a control unit for calibrating the azimuth by compensating the voltage values outputted from the geomagnetism measuring unit using the pitch angle and the roll angle measured by the acceleration sensor and normalizing the compensated voltage values to values within a predetermined range.

The geomagnetism measuring unit may be provided with two-axis flux gates provided in X-axis and Y-axis directions which are orthogonal to each other on a plane formed by the geomagnetic sensor, and outputs voltage values corresponding to the geomagnetism through the two-axis flux gates.

The control unit compensates actual voltage values of the X-axis and Y-axis flux gates, which are measured by the geomagnetic sensor as the geomagnetic sensor takes a predetermined number of turns, by reflecting the pitch angle and the roll angle in the actual measured values, and then calculates the normalization factors using maximum and minimum values among the compensated values, so that the control unit can obtain the normalization factors in which an effect due to tilting of the geomagnetic sensor is compensated. The normalization factors include a bias factor and a scale factor, which are expressed by specified equations.

In another aspect of the present invention, there is provided a normalization method for mapping output values of a geomagnetic sensor as values within a predetermined range, according to an exemplary embodiment of the present invention, which includes the steps of (a) measuring voltage values corresponding to measured geomagnetism as the geomagnetic sensor is rotated for a predetermined number of revolutions; (b) measuring a pitch angle and a roll angle of the geomagnetic sensor during performing of the step (a); (c) compensating the voltage values by reflecting the pitch angle and the roll angle in the measured values; (d) calculating specified normalization factors using maximum and minimum values among the compensated voltage values; and (e) normalizing the voltage values outputted from the geomagnetic sensor using the normalization factors.

The step (a) may obtain the voltage values corresponding to the geomagnetism using two-axis flux gates provided in X-axis and Y-axis directions, which are orthogonal to each other on a plane formed by the geomagnetic sensor.

In this case, the step (a) may include the steps of applying drive pulse signals to the two-axis flux gates; and outputting through the two-axis flux gates the voltage values corresponding to the geomagnetism produced by the drive pulse signals.

Meanwhile, the step (b) may calculate the pitch angle and the roll angle through acceleration of gravity measured using orthogonal X-axis and Y-axis acceleration sensors.

The actual voltage values of the X-axis and Y-axis flux gates are compensated by substituting the calculated pitch angle and roll angle in a specified equation. The maximum and minimum values are determined among the whole compensated voltage values, and then the normalization factors are calculated using the maximum and minimum values. The normalization factors include a bias factor and a scale factor.

Consequently, the normalization using the normalization factors, in which the effect caused by the tilting of the geomagnetic sensor is compensated. This can reduce the error that occurs due to the tilting of the geomagnetic sensor during the azimuth calibration.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF EXEMPLARY EMBODIMENTS

Certain exemplary embodiments of the present invention will be described in greater detail with reference to the accompanying drawings.

The matters defined in the description such as a detailed construction and elements are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 1:
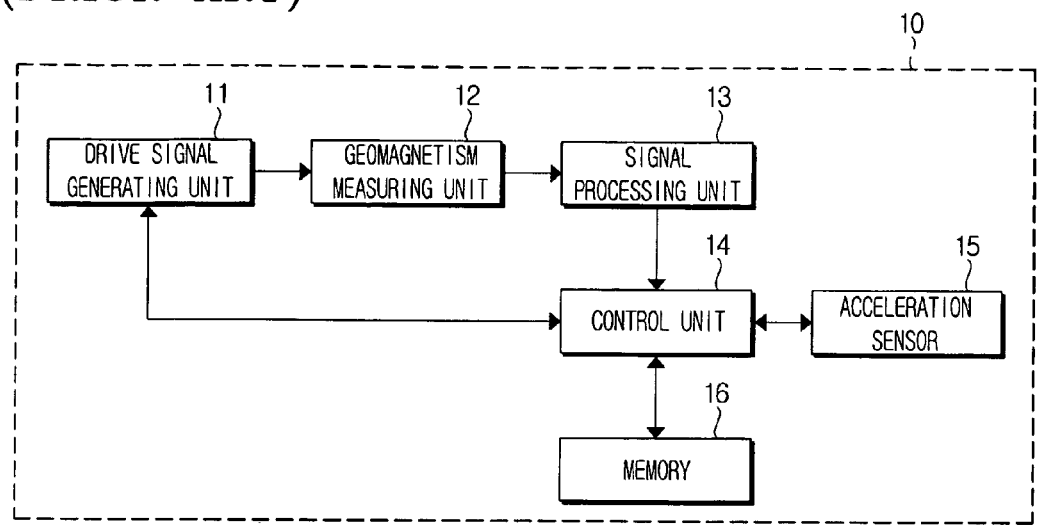
FIG. 1 is a block diagram illustrating the construction of a conventional flux-gate type geomagnetic sensor.
Figure 2:
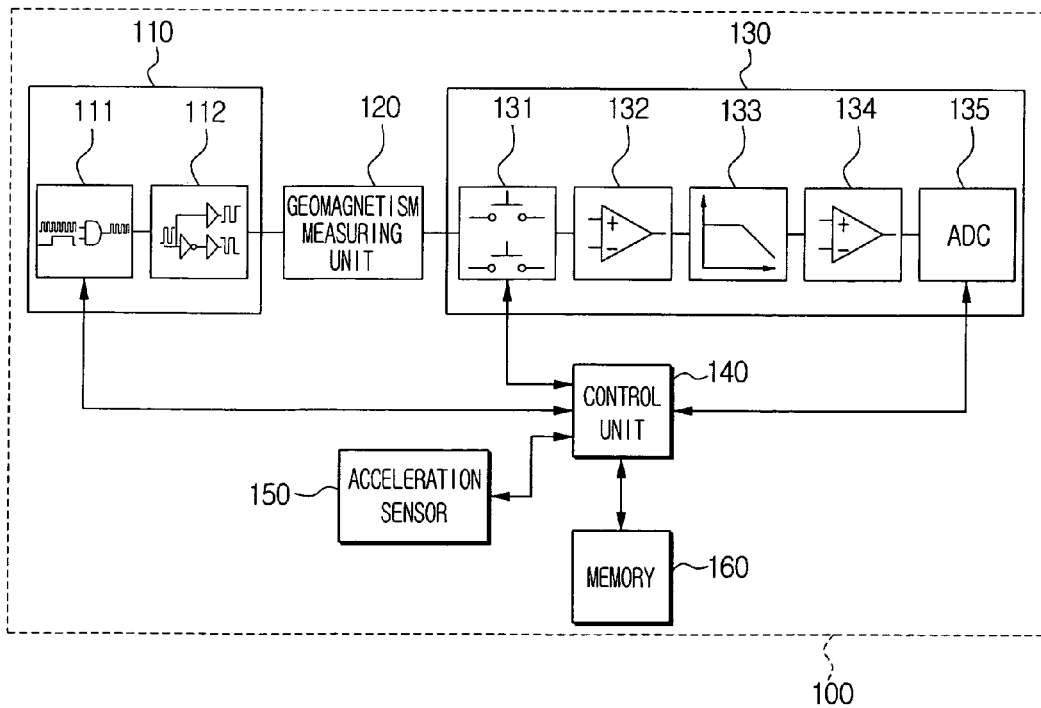
FIG. 2 is a block diagram illustrating the construction of a geomagnetic sensor according to an exemplary embodiment of the present invention.

FIG. 2 is a block diagram illustrating the construction of a geomagnetic sensor according to an exemplary embodiment of the present invention. Referring to FIG. 2, the geomagnetic sensor 100 according to the exemplary embodiment of the present invention the present invention includes a drive signal generating unit 110, a geomagnetism measuring unit 120, a signal processing unit 130, a control unit 140, an acceleration sensor 150, and a memory 160.

The drive signal generating unit 110 serves to generate and output a drive signal for driving the geomagnetism measuring unit 120. Generally, such a drive signal may be a pulse wave and an inverted pulse wave. Specifically, the drive signal generating unit 110 includes a pulse generating unit 111 and a pulse amplifying unit 112, and a pulse signal generated by and outputted from the pulse generating unit 111 is amplified and inversion-amplified through the pulse amplifying unit 112.

The pulse generating unit 112 has several amplifiers and inverters, and amplifies and inversion-amplifies the pulse signal outputted from the pulse generating unit 111 to output two pulse signals having different phases.

The geomagnetism measuring unit 120 includes two X-axis and Y-axis flux gates provided on the orthogonal X and Y axes. The geomagnetism measuring unit 120 is driven by the pulse signal and the inverted pulse signal inputted from the X-axis and Y-axis flux gates, respectively, and outputs detection signals corresponding to electromotive forces generated by the driving of the flux gates. In FIG. 2, the X-axis and Y-axis flux gates are installed in a manner that two magnetic cores of a square ring type are placed in X-axis and Y-axis directions, respectively, and a drive coil and a detection coil are wound on the respective magnetic core. If the drive pulse is applied to the drive coil, the X-axis and Y-axis flux gates produce magnetism, and the detection coils detect the electromotive forces accordingly.

The signal processing unit 130 serves to convert the electromotive forces into voltage values of the X-axis and Y-axis flux gates through a series of processes. Specifically, the signal processing unit 130 includes a chopping circuit 131, a first amplifier 132, a filter 133, a second amplifier 134, and an analog-to-digital (A/D) converter 135.

Electric signals induced and outputted from the X-axis and Y-axis flux gates of the geomagnetism measuring unit 120 are chopped through switches built in the chopping circuit 131. The chopped signals are differential-amplified by the first amplifier 132, filtered by the filter so that signals within a predetermined range pass through the filter, and then finally amplified by the second amplifier 134. The amplified signals are converted into digital voltage values through the A/D converter 135.

Meanwhile, the acceleration sensor 150 includes two orthogonal X-axis and Y-axis acceleration sensors installed in X-axis and Y-axis directions, respectively, and serves to calculate a pitch angle and a roll angle from the voltage values measured by the X-axis and Y-axis acceleration sensors.

Figure 3:
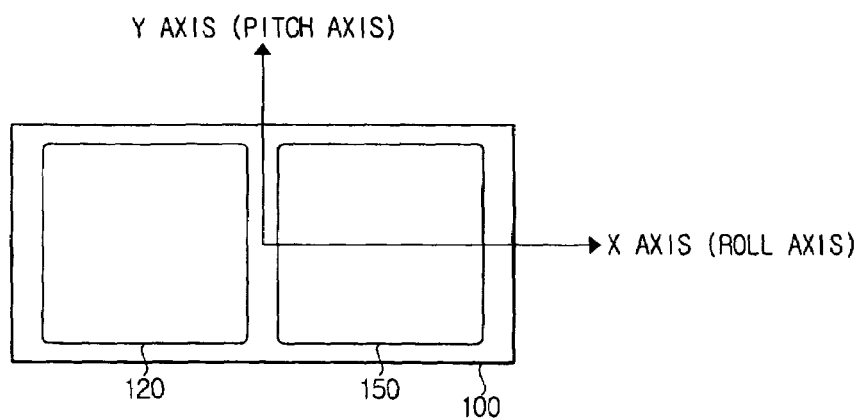
FIG. 3 is a view illustrating two axes which provide the base for measuring a pitch angle and a roll angle on a geomagnetic sensor according to an exemplary embodiment of the present invention.

FIG. 3 illustrates two orthogonal axes that provide the base for measuring a pitch angle and a roll angle on the geomagnetic sensor 100 having the geomagnetism measuring unit 120 and the acceleration sensor 150 built therein. If the geomagnetic sensor rotates around the X axis, the angle between the geomagnetic sensor and the X-Y plane becomes greater. In this case, the angle is called a roll angle φ, and the X axis may be called a roll axis. Meanwhile, if the geomagnetic sensor rotates around the Y axis, the angle between the geomagnetic sensor and the X-Y plane also becomes greater. In this case, the angle is called a pitch angle θ, and the Y axis may be called a pitch axis.

Meanwhile, the memory 160 stores information about pitch and roll angles measured through the acceleration sensor 150, dip angle λ, voltage values measured as the geomagnetism measuring unit 120 rotates for a predetermined number of revolutions, etc.

The control unit 140 calibrates the azimuth by substituting the information stored in the memory 160 in specified equations. The geomagnetic voltage values measured by the geomagnetism measuring unit 120 may be expressed by sine and cosine functions, and it is required for the control unit 140 to perform a normalization for mapping the actual measured geomagnetism voltage values onto values within a predetermined range for the azimuth calibration. In this case, specified normalization factors are required for the normalization. Generally, a bias factor and a scale factor are used as the normalization factors, which can be given by the following equation.

$$X_{bias} = \frac{X_{max} + X_{min}}{2}, \quad Y_{bias} = \frac{Y_{max} + Y_{min}}{2} \quad \text{[Equation 1]}$$

$$X_{scal} = \frac{X_{max} - X_{min}}{2}, \quad Y_{scal} = \frac{Y_{max} - Y_{min}}{2}$$

In the above equation, $X_{bias}$ and $Y_{bias}$ denote bias factors of X-axis and Y-axis voltage values, $X_{scal}$ and $Y_{scal}$ denote scale factors of X-axis and Y-axis voltage values, $X_{max}$ and $X_{min}$ denote maximum and minimum values of the X-axis voltage values, and $Y_{max}$ and $Y_{min}$ denote maximum and minimum values of the Y-axis voltage values.

The maximum and minimum voltage values used in the equation 1 are determined among the voltage values which are measured as the geomagnetic sensor 100 rotates for a predetermined number of revolutions in a horizontal state and stored in the memory 160.

Figure 4:
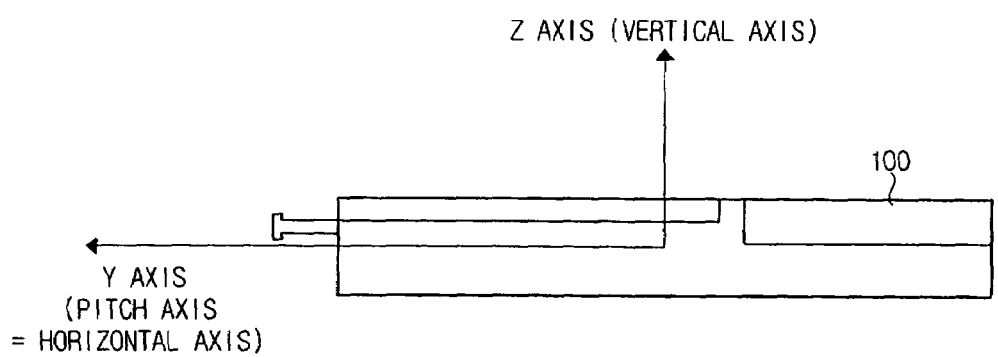
FIG. 4 is a view illustrating two axes which provide the base for measuring a pitch angle and a roll angle on a portable phone having a built-in geomagnetic sensor according to an exemplary embodiment of the present invention.

FIG. 4 shows two axes that provide the base for measuring a pitch angle and a roll angle on a portable phone having a built-in geomagnetic sensor 100 in the case of rotating the portable phone for the azimuth measurement. Specifically, the maximum values and the minimum values are determined among the measured X-axis and Y-axis voltage values, which are measured as the portable phone rotates around a Z axis that is perpendicular to the X-Y plane. At this time, both the pitch angle and the roll angle should be kept 0°, i.e., in the horizontal state. However, as described above, the horizontal state may be broken due to the shaking of the portable phone during the rotation of the portable phone, or in the case that the geomagnetic sensor is unavoidably installed in a tilting state in the portable phone, it may be difficult to keep the geomagnetic sensor in the horizontal state.

Figure 5:
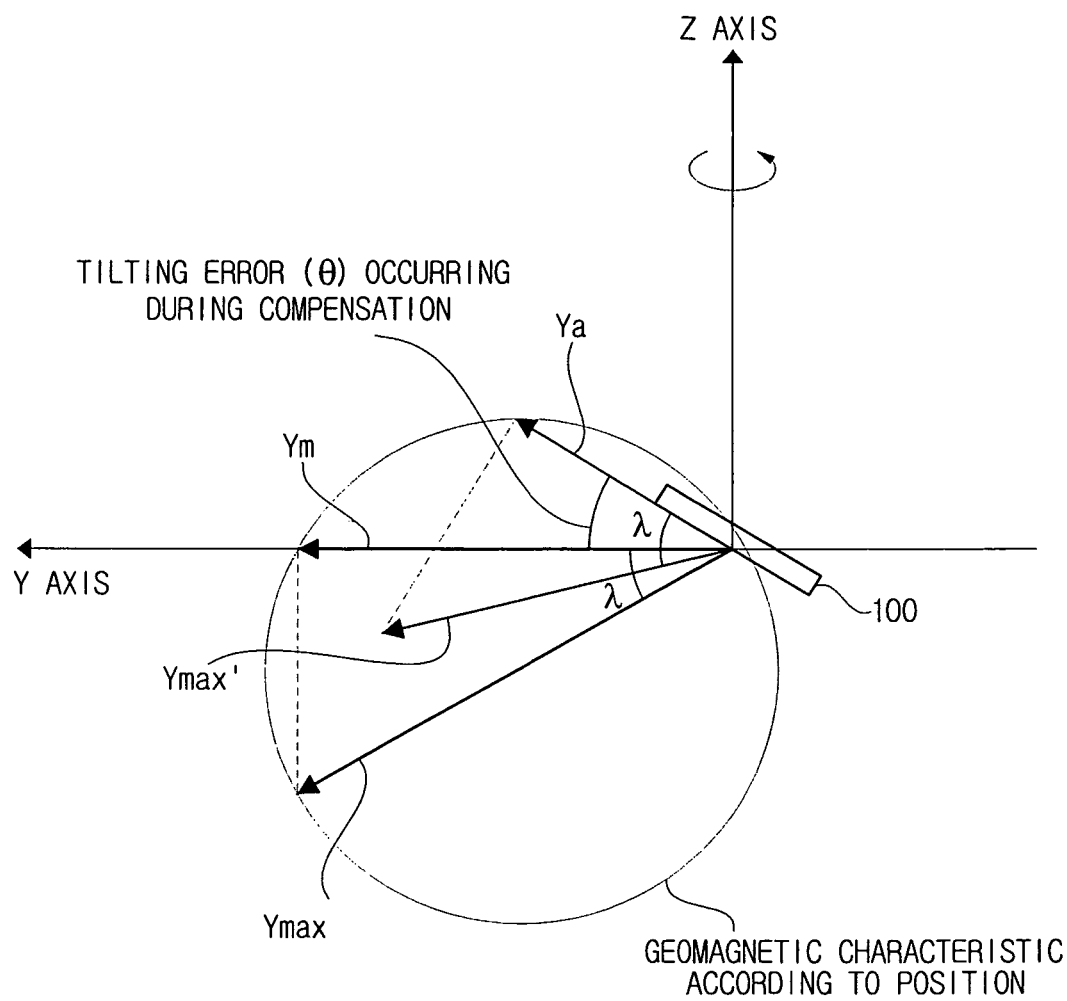
FIG. 5 is a view provided for explaining a tilting error occurring during an azimuth measurement using the geomagnetic sensor according to an exemplary embodiment of the present invention.

FIG. 5 shows the difference between the maximum geomagnetism voltage value in the case that the horizontal state is kept during the rotation of the portable phone and the maximum geomagnetism voltage value in the case that the tilting error occurs. Specifically, if the actual measured voltage value in the horizontal state is $Y_m$ in the case that the portable phone rotates around the Z axis by a predetermined angle, the Y-axis maximum geomagnetism voltage value can be expressed by $Y_{max}=Y_m/\cos \lambda$ in consideration of the effect of the dip angle $\lambda$. However, if a tilting error occurs as much as a specified pitch angle $\theta$, the actual Y-axis geomagnetism voltage value measures $Y_a$, and thus the maximum geomagnetism voltage value becomes $Y_{max}'=Y_a/\cos \lambda$. This means that an error as much as about $(Y_m-Y_a)/\cos \lambda$ occurs due to the tilting. In the same manner, an error of a specified range occurs in the minimum voltage value because of the difference between the actual measured voltage value and the measured voltage value in the horizontal state. Consequently, the normalization factors such as the offset factor and scale factor are calculated using the erroneous maximum and minimum values, and this causes an error to occur in the result of normalization.

Accordingly, the control unit 140, if the tilting is detected in a state that the pitch angle and the roll angle are detected not to be 0° through the acceleration sensor 150, should compensate for the effect caused by the tilting. For this, as shown in FIG. 5, the maximum geomagnetism voltage value can be compensated by mapping $Y_a$ onto $Y_m$.

Specifically, the respective $Y_a$ value, which is measured as the geomagnetic sensor 100 rotates around the Z axis by a predetermined angle, is compensated by reflecting the effect of the tilting, and then stored in the memory 160. If the rotation of the geomagnetic sensor 100 is completed, the control unit 140 determines the maximum and minimum values among the recorded Y-axis voltage values, and calculates the normalization factors using the maximum and minimum voltage values.

Meanwhile, although FIG. 5 shows the tilting in a direction where the pitch angle is changed, the maximum and minimum voltage values can be determined among the X-axis voltage values in the same manner even in the case of the tilting in a direction where the roll angle is changed.

As described above, the method of compensating the output values of the geomagnetism measuring unit 120 by reflecting the pitch angle and the roll angle can be expressed by the following equation.

$$X_c = X_s/\cos(\theta+\lambda)$$

$$Y_c = Y_s/\cos(\phi+\lambda) \quad \text{[Equation 2]}$$

In the equation 2, $X_c$ and $Y_c$ denote compensated X-axis and Y-axis voltage values, $X_s$ and $Y_s$ denote actual X-axis and Y-axis voltage values, $\theta$ denotes a pitch angle, $\phi$ denotes a roll angle, and $\lambda$ denotes a dip angle.

If the compensated X-axis and Y-axis voltage values calculated according to the equation 2 are stored in the memory 160 and the rotation of the geomagnetic sensor 100 is completed, the maximum and minimum values are determined among the recorded values.

By substituting the determined maximum and minimum values in the equation 1, the normalization factors of the X-axis and Y-axis flux-gate voltage values are calculated.

As described above, the normalization factor is required for the normalization that maps the actual output values of the X-axis and Y-axis flux gates onto values of a predetermined range. The normalization performed using the bias factor and the scale factor obtained by the equation 1 can be expressed by the following equation.

$$X_{norm} = \frac{(X-X_{bias})}{X_{scal}} * \cos\lambda \quad \text{[Equation 3]}$$

$$Y_{norm} = \frac{(Y-Y_{bias})}{Y_{scal}} * \cos\lambda$$

In equation 3, X and Y denote voltage values of X-axis and Y-axis flux gates, $X_{bias}$ and $Y_{bias}$ denote the X-axis and Y-axis bias factors, respectively. $X_{scal}$ and $Y_{scal}$ denote the X-axis and Y-axis scale factors, respectively, $\lambda$ denotes a dip angle, and $X_{norm}$ and $Y_{norm}$ denote normalized voltage values of the X-axis and Y-axis flux gates.

If the normalization is performed by the equation 3, the output values of the geomagnetism measuring unit 120 are mapped onto values of a predetermined range.

Meanwhile, the normalization as described above can also be applied to the acceleration sensor 150. That is, in order to measure the pitch angle and the roll angle, the acceleration sensor 150 performs the normalization for mapping output values of X-axis and Y-axis acceleration sensors onto output values of a predetermined range. For this, the normalization factors are obtained by determining the maximum and minimum values among the X-axis and Y-axis acceleration sensor output values, and the normalization is performed using the obtained normalization factors.

The pitch angle and the roll angle consequently obtained are expressed by the following equation.

$$\theta = \sin^{-1}(Xt_{norm}) \quad \text{[Equation 4]}$$

$$\phi = \sin^{-1}\left(\frac{Yt_{norm}}{\cos\theta}\right)$$

In the equation 4, $Xt_{norm}$ denotes a normalized output value of an X-axis acceleration sensor, $Yt_{norm}$ a normalized output value of a Y-axis acceleration sensor, $\theta$ a pitch angle, and $\phi$ a roll angle, respectively. If the pitch angle and the roll angle are measured through the above calculation process, the control unit 140 can apply them to the azimuth calibration. Meanwhile, in measuring the tilting, the maximum values of 90° and the minimum value of 0° may be manually set instead of performing the above calculation process.

If the normalization is performed using the compensated normalization factors as described above, the azimuth can be calibrated. In the case of using the two-axis flux gates, the control unit 140 calibrates the azimuth by calculating the output value of the Z axis that is perpendicular to the X-Y plane.

That is, since the azimuth is a three-dimensional space value expressed by three axes, the control unit requires three-axis output values in order to calibrate the azimuth using the measured results. This virtual normalized Z-axis output value can be calculated using the following equation.

$$Z_{norm} = \frac{(X_{norm}*\sin\theta - Y_{norm}*\cos\theta*\sin\phi + \sin\lambda)}{\cos\theta*\cos\phi} \quad \text{[Equation 5]}$$

In the equation 5, Z denotes a virtual Z-axis voltage value, and $Z_{norm}$ denotes a value obtained by normalizing the Z-axis voltage value.

If the normalized value of the virtual Z-axis voltage value is calculated, the control unit 140 can finally calibrate the azimuth a using the following equation.

$$\alpha = \tan^{-1}\left( \frac{Z_{norm} * \sin\phi - Y_{norm} * \cos}{X_{norm} * \cos\theta + Y_{norm} * \sin\theta * \sin\phi + Z_{norm} * \sin\theta * \cos\phi} \right) \quad \text{[Equation 6]}$$

Since the finally calibrated azimuth α is an output value normalized by reflecting the degree of tilting therein even though the geomagnetic sensor 100 is in a tilting state, the error caused by the tilting can be prevented.

Figure 6:
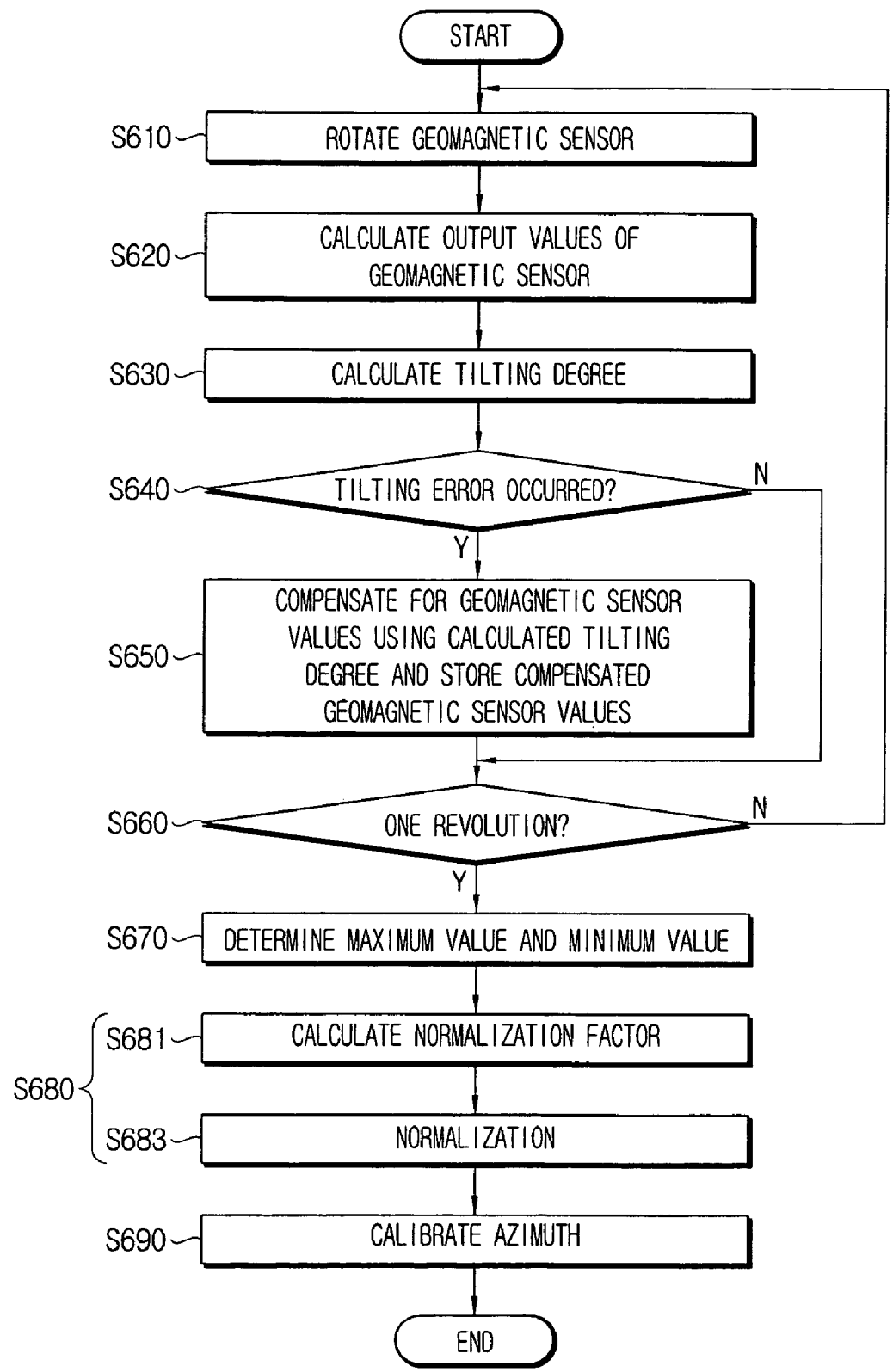
FIG. 6 is a flowchart illustrating a method of calibrating an accurate azimuth by reflecting the tilting error in the geomagnetic sensor according to an exemplary embodiment of the present invention.

FIG. 6 is a flowchart illustrating a method of calibrating an accurate azimuth by reflecting the tilting error in the geomagnetic sensor 100 according to an exemplary embodiment of the present invention.

Referring to FIG. 6, in order to measure the azimuth using the geomagnetic sensor 100, it is required to rotate the geomagnetic sensor 100 for a predetermined number of revolutions in a horizontal state (step S610).

While the geomagnetic sensor 100 rotates, the drive signal generating unit 110 generates and applies a drive pulse signal to the geomagnetism measuring unit 120. The geomagnetism measuring unit 120 outputs X-axis and Y-axis flux-gate voltage values corresponding to the drive pulse signal whenever the geomagnetic sensor rotates for a predetermined angle, and the control unit 140 stores the voltage values in the memory 160 (step S620).

Then, the acceleration sensor 150 measures the tilt, i.e., the pitch angle and the roll angle (step S630). Since the tilting error may occur during the rotation of the geomagnetic sensor even though a user puts the geomagnetic sensor in the horizontal state, the control unit judges whether the geomagnetic sensor is kept in the horizontal state by measuring the pitch angle and the roll angle (step S640).

If the tilting error occurs, the control unit 140 compensates the geomagnetic sensor values using the measured pitch angle and roll angle (step S650). In this case, the compensation operation is performed in accordance with the equation 2 as described above.

The measurement and compensation for the geomagnetism voltage values are formed until the rotation for the azimuth measurement is completed, and the resultant values are stored in the memory 160. If it is judged that one revolution is completed (step S660), the control unit 140 determines the maximum value and the minimum value among the voltage values recorded in the memory 160 (step S670). Although FIG. 6 illustrates the case that the geomagnetic sensor rotates for one revolution, it is also possible to perform the compensation process as rotating the geomagnetic sensor for two or more revolutions for more precise measurement.

Then, the normalization process is performed using the determined maximum and minimum values (step S680). The control unit 140 calculates the bias factor and the scale factor as the normalization factors (step S681). The normalization factors are expressed by the equation 1 as described above.

If the normalization factors are obtained, the control unit 140 normalizes the actual geomagnetic sensor values by substituting the normalization factors in the equation 3 (step S683). Accordingly, the normalization is performed with the effect of the tilting compensated for. This normalization may be used in the process of measuring the pitch angle and the roll angle using the acceleration sensor 150.

Finally, the azimuth is calibrated using the normalized voltage values (step S690). The control unit 140 can calculate the normalized output values of the virtual Z axis from the equation 5, using the information about the pitch angles, roll angles, dip angle, etc., recorded in the memory 160. Then, the control unit 140 calibrates the azimuth from the equation 6, using the normalized output values of the virtual Z axis and other information.

If the normalization factors are calculated as described above, the effect caused by the tilting can be compensated, and thus the accurate azimuth can be calibrated even in the tilting state of the geomagnetic sensor.

As described above, according to the present invention, accurate normalization factors can be calculated by compensating for the effect caused by the tilting of the geomagnetic sensor even in the event that the geomagnetic sensor is shaken while the user rotates the geomagnetic sensor or in the event that the geomagnetic sensor is unavoidably installed in the tilting state in the portable phone. By normalizing the actual measured geomagnetism voltage values using the accurate normalization factors, the effect caused by the tilting is compensated for, and thus the accurate azimuth can be calibrated.

The foregoing embodiment and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

What is claimed is:

1. A geomagnetic sensor, comprising:
   a geomagnetism measuring unit, including an X axis fluxgate comprising a first magnetic core and a Y axis fluxgate comprising a second magnetic core, which generates voltage values corresponding to measured geomagnetism when the X axis fluxgate is driven by a first signal and the Y axis fluxgate is driven by a second signal;
   an acceleration sensor, which measures a pitch angle and a roll angle which indicate a tilting degree of the geomagnetic sensor based on a horizontal state of the geomagnetic sensor; and
   a control unit, which calibrates an azimuth by compensating the voltage values generated by the geomagnetism measuring unit using the pitch angle and the roll angle measured by the acceleration sensor and which normalizes the compensated voltage values to values within a predetermined range,
   wherein the control unit compensates actual X-axis and Y-axis voltage values of the X-axis and Y-axis flux gates, respectively, which are generated by the geomagnetic sensor as the geomagnetic sensor takes a predetermined number of turns, by reflecting the pitch angle and the roll angle in the actual measured values in order to provide compensated voltage values, and then calculates normalization factors using maximum and minimum values among the compensated voltage values, and
   wherein the control unit compensates the X-axis and Y-axis voltage values using the following equations:

$X_c = X_s/\cos(\theta+\lambda)$ $Y_c = Y_s/\cos(\phi+\lambda)$ where $X_c$ and $Y_c$ denote compensated X-axis and Y-axis voltage values, $X_s$ and $Y_s$ denote actual X-axis and Y-axis voltage values, θ denotes a pitch angle, φ denotes a roll angle, and λ denotes a dip angle.

2. A geomagnetic sensor, comprising:

a geomagnetism measuring unit, including an X axis fluxgate comprising a first magnetic core and a Y axis fluxgate comprising a second magnetic core, which generates voltage values corresponding to measured geomagnetism when the X axis fluxgate is driven by a first signal and the Y axis fluxgate is driven by a second signal;

an acceleration sensor, which measures a pitch angle and a roll angle which indicate a tilting degree of the geomagnetic sensor based on a horizontal state of the geomagnetic sensor; and a control unit, which calibrates an azimuth by compensating the voltage values generated by the geomagnetism measuring unit using the pitch angle and the roll angle measured by the acceleration sensor and which normalizes the compensated voltage values to values within a predetermined range, wherein the control unit compensates actual X-axis and Y-axis voltage values of the X-axis and Y-axis flux gates, respectively which are generated by the geomagnetic sensor as the geomagnetic sensor takes a predetermined number of turns by reflecting the pitch angle and the roll angle in the actual measured values in order to provide compensated voltage values, and then calculates normalization factors using maximum and minimum values among the compensated voltage values, and wherein the normalization factors are a bias factor and a scale factor expressed by the following equations:

$$X_{bias} = \frac{X_{\max} + X_{\min}}{2}, Y_{bias} = \frac{Y_{\max} + Y_{\min}}{2}$$
$$X_{scal} = \frac{X_{\max} - X_{\min}}{2}, Y_{scal} = \frac{Y_{\max} - Y_{\min}}{2}$$

where $X_{bias}$ and $Y_{bias}$ denote bias factors of X-axis and Y-axis voltage values, $X_{scal}$ and $Y_{scal}$ denote scale factors of X-axis and Y-axis voltage values, $X_{max}$ and $X_{min}$ denote maximum and minimum values of the X-axis voltage values, and $Y_{max}$ and $Y_{min}$ denote maximum and minimum values of the Y-axis voltage values.

3. The geomagnetic sensor as claimed in claim 2, wherein the control unit normalizes the X-axis and Y-axis flux-gate voltage values by substituting the normalization factors in the following equations:

$$X_{norm} = \frac{(X - X_{bias})}{X_{scal}} * \cos\lambda$$
$$Y_{norm} = \frac{(Y - Y_{bias})}{Y_{scal}} * \cos\lambda$$

where X and Y denote voltage values of X-axis and Y-axis flux gates, $X_{norm}$ and $Y_{norm}$ denote normalized voltage values of the X-axis and Y-axis flux gates, and λ denotes a dip angle.

4. A normalization method for mapping output values of a geomagnetic sensor as values within a predetermined range, the method comprising:

(a) generating X-axis and Y-axis voltage values corresponding to measured geomagnetism as the geomagnetic sensor is rotated for a predetermined number of revolutions, when an X axis fluxgate comprising a first magnetic core is driven by a first signal and a Y axis fluxgate comprising a second magnetic core is driven by a second signal;

(b) measuring a pitch angle and a roll angle of the geomagnetic sensor during performing of step (a);

(c) compensating for the voltage values generated in step (a) by reflecting the pitch angle and the roll angle measured in step (b) in order to provide compensated voltage values;

(d) calculating normalization factors using maximum and minimum values among the compensated voltage values; and (e) normalizing the compensated voltage values outputted from the geomagnetic sensor using the normalization factors, wherein step (c) compensates the X-axis and Y-axis voltage values using the following equations:

$$X_c = X_s/\cos(\theta+\lambda)$$

$$Y_c = Y_s/\cos(\phi+\lambda)$$

where $X_c$ and $Y_c$ denote compensated X-axis and Y-axis voltage values, $X_s$ and $Y_s$ denote actual X-axis and Y-axis voltage values, θ denotes a pitch angle, φ denotes a roll angle, and λ denotes a dip angle.

5. A normalization method for mapping output values of a geomagnetic sensor as values within a predetermined range, the method comprising:

(a) generating X-axis and Y-axis voltage values corresponding to measured geomagnetism as the geomagnetic sensor is rotated for a predetermined number of revolutions, when an X axis fluxgate comprising a first magnetic core is driven by a first signal and a Y axis fluxgate comprising a second magnetic core is driven by a second signal;

(b) measuring a pitch angle and a roll angle of the geomagnetic sensor during performing of step (a);

(c) compensating for the voltage values generated in step (a) by reflecting the pitch angle and the roll angle measured in step (b) in order to provide compensated voltage values;

(d) calculating normalization factors using maximum and minimum values among the compensated voltage values; and (e) normalizing the compensated voltage values outputted from the geomagnetic sensor using the normalization factors, wherein the normalization factors calculated at step (d) are a bias factor and a scale factor expressed by the following equations:

$$X_{bias} = \frac{X_{\max} + X_{\min}}{2}, Y_{bias} = \frac{Y_{\max} + Y_{\min}}{2}$$
$$X_{scal} = \frac{X_{\max} - X_{\min}}{2}, Y_{scal} = \frac{Y_{\max} - Y_{\min}}{2}$$

where $X_{bias}$ and $Y_{bias}$ denote bias factors of X-axis and Y-axis voltage values, $X_{scal}$ and $Y_{scal}$ denote scale factors of X-axis and Y-axis voltage values, $X_{max}$ and $X_{min}$ denote maximum and minimum values of the X-axis voltage values, and $Y_{max}$ and $Y_{min}$ denote maximum and minimum values of the Y-axis voltage values.

6. The method as claimed in claim 5, wherein step (e) normalizes the X-axis and Y-axis flux-gate voltage values by substituting the normalization factors in the following equations:

$$X_{norm} = \frac{(X - X_{bias})}{X_{scal}} * \cos\lambda$$

$$Y_{norm} = \frac{(Y - Y_{bias})}{Y_{scal}} * \cos\lambda$$

where X and Y denote voltage values of X-axis and Y-axis flux gates, $X_{norm}$ and $Y_{norm}$ denote normalized voltage values of the X-axis and Y-axis flux gates, and X denotes a dip angle.

* * * * *